United States Patent
Chordia et al.

(10) Patent No.: US 7,984,031 B2
(45) Date of Patent: Jul. 19, 2011

(54) QUERY BUILDER FOR TESTING QUERY LANGUAGES

(75) Inventors: Sushil Kumar Chordia, Bothell, WA (US); Edward John Triou, Jr., Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 428 days.

(21) Appl. No.: 12/184,627

(22) Filed: Aug. 1, 2008

(65) Prior Publication Data

US 2010/0030757 A1 Feb. 4, 2010

(51) Int. Cl.
*G06F 17/30* (2006.01)
(52) U.S. Cl. ....................................................... 707/705
(58) Field of Classification Search .................. 707/3, 4, 707/705; 717/125
See application file for complete search history.

(56) References Cited

U.S. PATENT DOCUMENTS

| | | | |
|---|---|---|---|
| 6,175,829 B1 | 1/2001 | Li et al. | |
| 6,286,131 B1 * | 9/2001 | Beers et al. | 717/125 |
| 6,430,556 B1 | 8/2002 | Goldberg et al. | |
| 6,505,190 B1 * | 1/2003 | Harel et al. | 707/754 |
| 2004/0162814 A1 * | 8/2004 | Bergholz et al. | 707/3 |
| 2005/0131889 A1 | 6/2005 | Bennett et al. | |
| 2006/0004740 A1 | 1/2006 | Dettinger et al. | |
| 2006/0195425 A1 | 8/2006 | Deem et al. | |
| 2006/0259459 A1 | 11/2006 | Wu et al. | |
| 2007/0233645 A1 | 10/2007 | Peterson et al. | |
| 2007/0239673 A1 * | 10/2007 | Barsness et al. | 707/3 |
| 2008/0097974 A1 * | 4/2008 | Chen et al. | 707/4 |

OTHER PUBLICATIONS

Query Builder, DbVisualizer 6.0, Jul. 2007. http://www.minq.se/products/dbvis/doc/main/doc/ug/queryBuilder/queryBuilder.html. Last accessed May 14, 2008, 13 pages.
Tisseghem. U2U CAML Query Builder and Execution Tool Released, Mar. 28, 2005. http://www.u2u.info/Blogs/Patrick/Lists/Posts/Post.aspx?ID=1252. Last accessed May 14, 2008, 8 pages.
Writing and Testing SQL Queries http://publib.boulder.ibm.com/infocenter/tivihelp/v2r1/index.jsp?topic=/com.ibm.itscm2.doc_5.1/scm51_admin170.html. Last accessed May 14, 2008, 1 page.
Query Builder, SQL Server 2005 Books Online, Sep. 2007. http://msdn.microsoft.com/en-us/library/ms186906.aspx. Last accessed May 14, 2008, 1 page.
Using SQL Builder for Database Queries http://www.adobe.com/livedocs/coldfusion/5.0/Using_ColdFusion_Studio/data4.htm. Last accessed May 14, 2008, 3 pages.
Query Builder http://publib.boulder.ibm.com/infocenter/ablxhelp/v9r5m0/index.jsp?topic=/com.ibm.db2.abx.dev.doc/abx-c-develop-230.html. Last accessed May 14, 2008, 1 page.

* cited by examiner

*Primary Examiner* — Etienne P LeRoux

(57) ABSTRACT

Query testing is enabled across one or more query languages utilizing an abstract representation of a query. From this abstract representation, queries associated with one or more specific query languages are generated. Further, a verification scheme can be implemented for a specific store and/or query language to facilitate generation of an expected result for comparison with an actual result of test query evaluation. Further yet, data driving and/or modeling can be leveraged to further aid query testing.

20 Claims, 14 Drawing Sheets

QUERY BUILDER FOR TESTING QUERY LANGUAGES

BACKGROUND

Query languages are computer languages employed to interrogate data sources. Such languages are typically classified as either database query languages or information retrieval query languages. Examples of query languages include SQL (Structured Query Language), T-SQL (Transact-SQL), eSQL (Entity SQL), XQuery (Extensible Markup Language Query), LINQ (Language Integrated Query), MDX (Multidimensional Expressions), and DMX (Data Mining Extensions), among others.

Testing a query language is a complex and challenging task. A tester must determine a representative subset of queries, which must be tested from an infinite set of valid queries. Once the representative set of queries is determined, the tester is faced with the task of verifying the results returned when the queries are executed.

A query expression is composed of a series of clauses that apply successive operations on data. A SQL query includes, at minimum, a target ("FROM") clause and a projection ("SELECT") clause. Additional clauses such as "WHERE" and "ORDERBY" are used to filter and shape the data returned when the query is executed.

When testing a query language, testers must not only test each clause, but they must also test any modifiers the clause supports (e.g., SELECT TOP, SELECT DISTINCT . . . ), and they must test the clauses in combination with each other. Add supporting features built into the language such as functions (e.g., SELECT Count(C) FROM . . . ), relational algebraic operators (e.g., FROM Customers JOIN Products) and sub-queries in expressions (e.g., SELECT Name FROM (SELECT Id, Name FROM Customers)), and the test matrix explodes. In fact, the possibility of sub-queries in expressions makes the set of valid queries infinite. These factors combine to make selecting the correct representative set of queries that must be tested a daunting task.

Once the tester has determined the set of queries to test, the next problem he/she will face is results verification. Even if you want to test a single query, which includes the minimal unmodified target and select clauses, verification of results is very difficult.

The choice of the data to test against is another important concern for the tester. If the data in the test database always returns empty results for the tested queries, only a small aspect of the query has been tested. For maximum coverage, data should be generated with the tested queries in mind.

Conventionally, testing approaches are custom for a query language leveraging expertise of a development team. Many such approaches have been a around for decades including crafting hard-coded query strings, baselining results, and sprinkling query knowledge throughout a test query. These conventional approaches have proven to be an expensive investment in terms of both upfront and maintenance costs as well as limited in coverage.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to query building for testing of one or more languages. In accordance with a disclosed aspect, an abstract query representation can be constructed. Based on this representation, numerous language specific test queries can be generated. Furthermore, various verification schemes can be implemented or configured with respect to a particular type of store and/or query to enable a determination of query correctness. Separation of query syntax/formatting and verifications enables more emphasis on test scenarios and less emphasis on details. In accordance with other disclosed aspects, abstract queries can be modeled and/or data driven to further facilitate testing of one or more query languages.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods pertaining to query testing are described in detail hereinafter. A language independent, abstract query representation is constructed. From this representation, one or more custom query builders can produce language specific formats. Further, a verification scheme can be implemented that automatically affords an expected result as well as comparison of the expected result with an actual result to determine query correctness. Test queries can also be data and/or model driven to facilitate automatic construction of arbitrarily complex query test cases that may not otherwise be generated.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
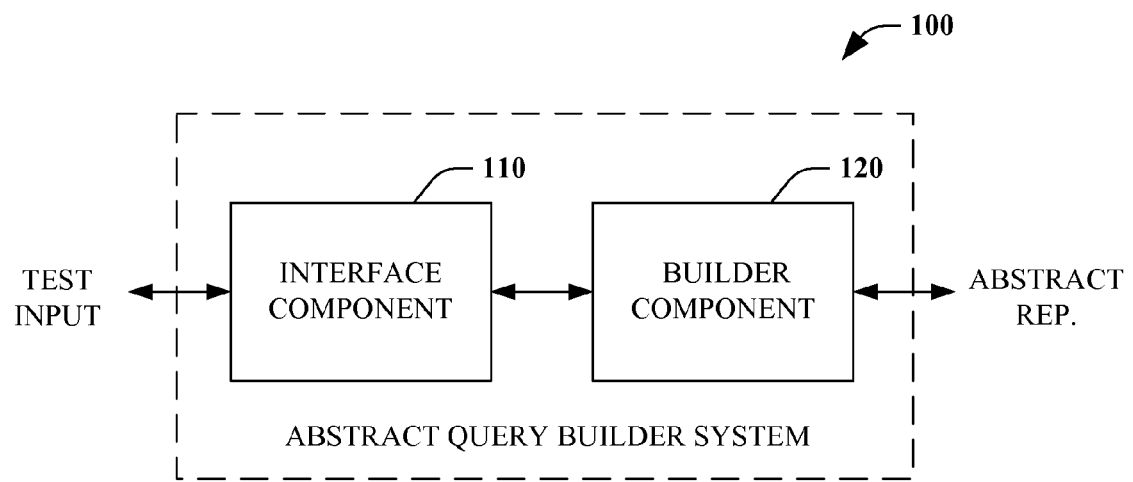
FIG. 1 is a block diagram of a query builder system in accordance with an aspect of the disclosed subject matter.

Referring initially to FIG. 1, a query builder system 100 is illustrated in accordance with an aspect of the claimed subject matter. Overall, the system 100 produces an abstract representation of a test input. The abstract representation is independent of any specific query language, format, or the like. For example, the representation can be a tree or table of operators and expressions. In one instance, the test input received or retrieved by the abstract query builder component 110 can be in a scenario-based form that is less dependent on query syntax and verification details than conventional approaches. In other words, the test input is more focused on a test scenario and less focused on details (e.g., formats, types, identifiers . . . ).

The query builder system 100 includes an interface component 110 and a builder component 120. The interface component 210 receives, retrieves, or otherwise acquires test input embodied as or descriptive of a desired test query. The builder component 220 builds or constructs an abstract representation of test input acquired by the interface component 210. In one instance, the builder component 220 can produce an expression tree including query operations (e.g., Select, From, Where, Sort . . . ) and expressions (e.g., predicate, projection, sorting . . . ).

In accordance with one embodiment, the abstract builder component system 100 and more specifically the interface component 110 receives or retrieves operators (e.g., methods) and expressions (e.g., parameters to those methods) as input. Accordingly, the component 110 need not perform any parsing or query extraction. Rather, the builder component 120 of the abstract query builder system 100 can generate an abstract representation given basic building blocks (e.g., operators and expressions). As will be described infra, a custom query builder or transform can exist that converts a concrete query into an abstract representation.

In accordance with one exemplary implementation, the interface component 210 can expose a build pattern or mechanisms utilized by the builder component 220 to construct an abstract query tree. Accordingly, it can operate as an application-programming interface (API). Consider a conventional query representation "SELECT*FROM Customers ORDER BY CustomerID". This is a hard-coded query string. Alternatively, the same test query can be represented as follows where the string is split into operators (From, Select and Orderby) and implied expressions (Customers, CustomerID):

```
public void Test1( )
{
    QB.From(Customers).Select( ).OrderBy(CustomerID).Verify( );
}
```

(Note that exemplary class definitions associated with this and subsequent examples can be found in Appendix A) This does not appear much different from the conventional query representation, except that there are some dots replacing spaces in the previous query. However, subtly, the string is being placed in a tree that can be visited and/or inspected easily (as well as verified). Operators are just a part. There are also expressions here "Customers" is an expression of the "From" operator and "CustomerID" is an expression of the "OrderBy" operator.

Queries can also include more complex expressions. For instance, consider the following conventional query: "SELECT*FROM Customers WHERE (CustomerID>5) AND (CustomerID<7)". Here, the "WHERE" operator includes a complex logical expression, which can be specified by dividing the expression into tuples. For example, the conventional query can be specified as follows:

```
public void Test2( )
{
    Query q = QB.From(Customers).Select( ).Where(
                Expression.And(
                    Expression.Greater(
                        Expression.Member(CustomerID),
                Expression.Constant(CustomerID.Type, 5)
                    ),
                    Expression.Less(
                        Expression.Member(CustomerID),
                Expression.Constant(CustomerID.Type, 7)
                    )
                )
            );
    q.Verify( );
}
```

As shown, the expression is split on "AND" and then ">" and "<."

Figure 2:
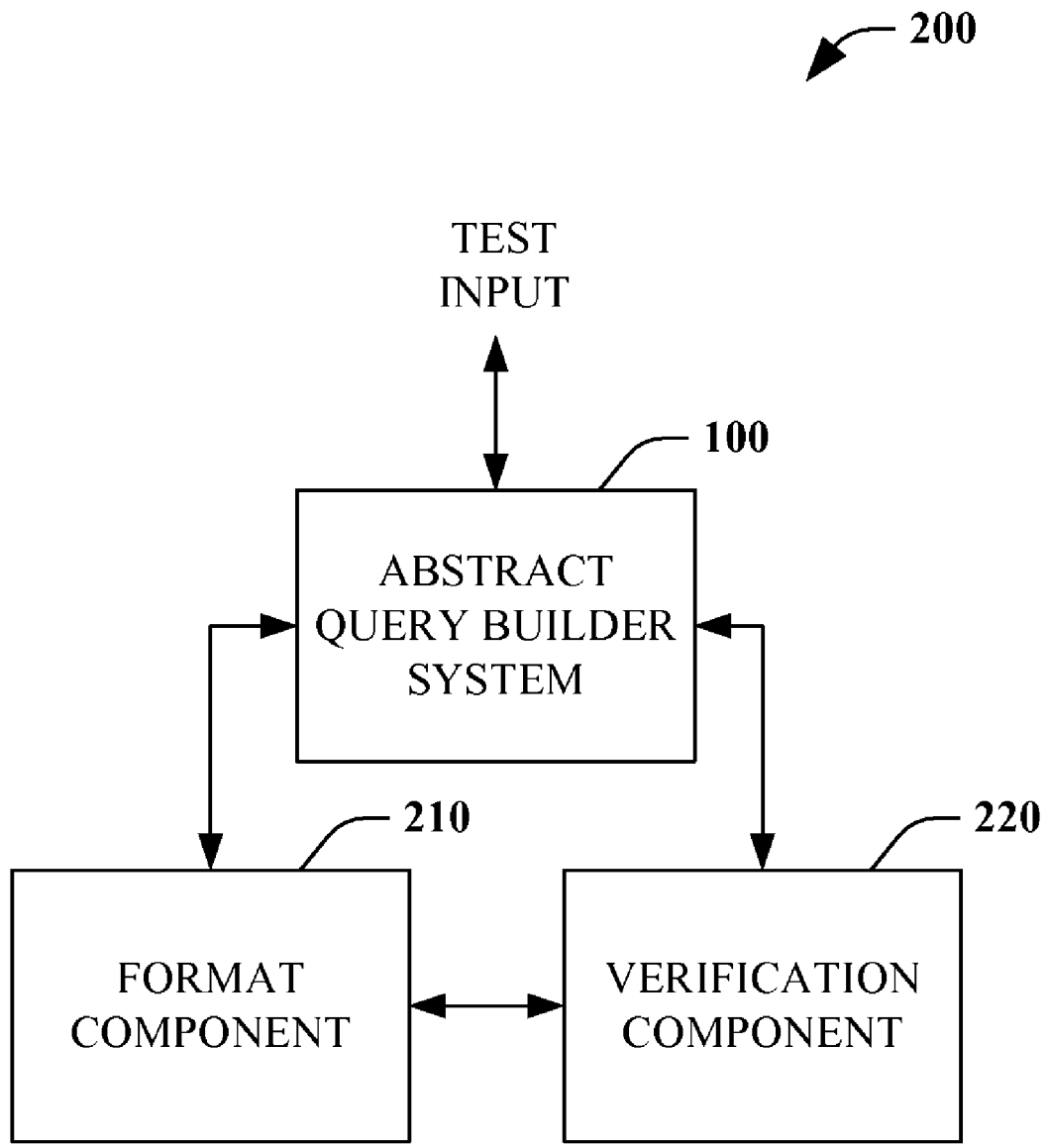
FIG. 2 is a block diagram of an abstract query builder system including default functionality in accordance with a disclosed aspect.

Turning to FIG. 2, an abstract query builder system 200 is illustrated in accordance with an aspect of the claimed subject matter. The system 200 includes abstract query builder system 100, as previously described with respect to FIG. 1. In brief, the system 100 receives test input and generates an abstract representation for employment in generation of language specific test queries. Although typically associated with customization as described later, the system 200 also includes communicatively coupled format component 210 and verification component 220 that enables generation of a default format and verifier.

The format component 210 provides a mechanism to produce a formatted or language specific test query from an abstract representation. For example, the format component 210 can produce a formatted string specifying a query in accordance with a particular query language. This can be accomplished via a mapping and/or transformation/translation rules, among other ways.

Verification component 220 is communicatively coupled to the abstract query builder system 100 and optionally to the format component 120. The verification component 220 is a mechanism for verifying query correctness. It should be appreciated that the verification component 130 can verify any query that can be constructed. In accordance with one aspect, the verification component 220 can be configured as a function of a data store and/or query language.

Figure 3:
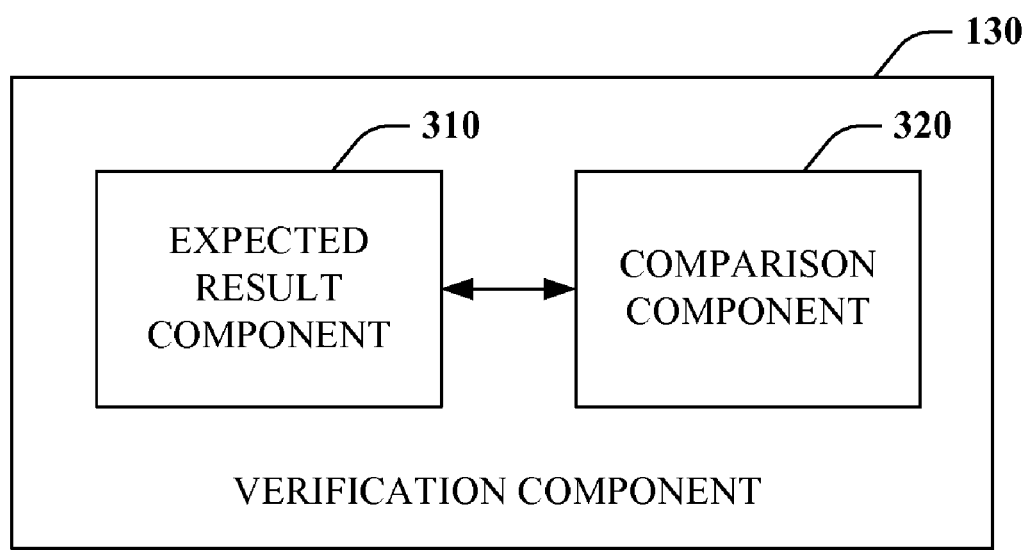
FIG. 3 is a block diagram of a representative verification component in accordance with an aspect of the disclosure.

Referring briefly to FIG. 3, a representative verification component 220 is illustrated in accordance with an aspect of the claimed subject matter. As shown, the verification component 220 includes an expected result component 310 and a comparison component 320. The expected result component 310 is a mechanism or means for generating a correct or expected query result. The comparison component 320 compares the expected result to an actual test result. Where results are the same, the query is correct. Where results are different, the query fails the test. Various mechanisms/schemes can be employed to produce an expected result for comparison to an actual result to determine if the tested query returned correct results.

In one instance, the verification component 220 can employ a reference baseline scheme that delegates generation of an expected result to reference platform such as another query system or similar technology. For example, the verification component 220 can call on the services of a language-integrated query (LINQ) engine. In this case, a LINQ query can be generated from the abstract query representation by way of format component 210. Subsequently, the query can be evaluated by way of verification component 220. It is to be appreciated that result form may differ. For example, the complete result can be returned or a checksum computed on the complete result, which can be compared to a checksum of the actual result.

In another case, the verification component 220 can utilize an expected cache scheme that produces and refines an internal expected cache. The verification component 220 can have or have access to test data. In this scenario, as the abstract query representation is being constructed a cache including test data can be refined as operators are called. For instance, when a query's projection is built, the cache includes only those specified columns from base tables, and when a filter is built, a sort can be performed and rows removed. Sorting is especially easy to execute since a table column includes a type, which implicitly knows how to compare data for that type.

It is to be noted and appreciated that the above presented verification schemes represent only a few means for verification. Other techniques are possible and are to be considered with the scope of the claimed subject matter including. Accordingly, the claimed subject matter is not limited to the exemplary schemes.

Separating query syntax/format and verification provides many advantages. In particular, this encourages development of test query scenarios independent of syntax and verification details. In other words, the scenarios are more focused on a particular testing case and less focused on details (e.g., format, types, identifiers . . . ). This improves comprehension of query scenarios and also makes them leveragable across query formats.

Figure 4:
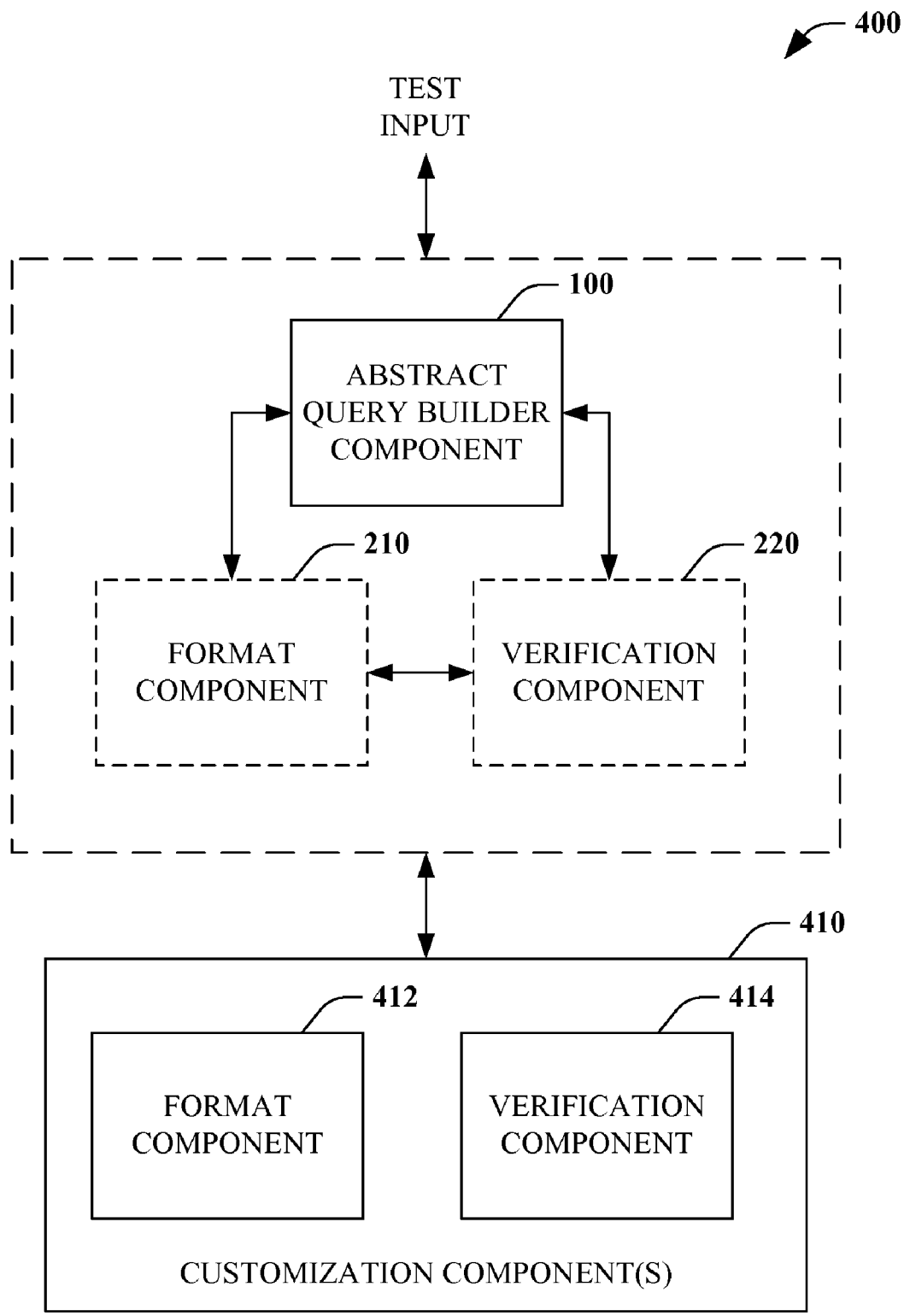
FIG. 4 is a block diagram of a customizable query generation system in accordance with a disclosed aspect.

Turning attention to FIG. 4, a customizable query test system 400 is depicted in accordance with an aspect of the claimed subject matter. Similar to system 200 of FIG. 2, the system 400 includes an abstract query builder system 100, format component 210, and verification component 220, as previously described. Recall, the query builder component 100 constructs an abstract representation of a test, the format component 210 constructs a query specific instance of the abstract test query, and the verification component 220 is operable to verify the correctness of the query. While the format component 210 and verification component 220 can be configured to work for any query language and/or data store combination, in accordance with one embodiment, they can provide a default implementation for one particular query language and/or store.

However, customization component(s) 410 provide a mechanism to modify the standard/default query language and/or verification scheme or alternatively provide such functionality by way of corresponding format component 412 and verification component 414. For example, functionality associated with format component 120 can be overridden by the customization component(s) 410, namely format component 412, to support derivation of a specific language query. Accordingly, the customization component(s) 410 could also be referred to as custom query builder. By way of example and not limitation, the customization component(s) 410 can correspond to one or more of a SQL query builder, T-SQL query builder, eSQL query builder or LINQ query builder, amongst others. Similarly, default verification scheme afforded by the verification component 130 can be overridden with an alternate and/or custom scheme afforded by verification component 414. In this manner, formatting and verification are override-able. Moreover, where a default format component 210 and verification component 220 are not present, the customization component(s) 410 provide similar functionality with respect to a particular query language by way of the format component 412 and verification component 414.

Figure 5:
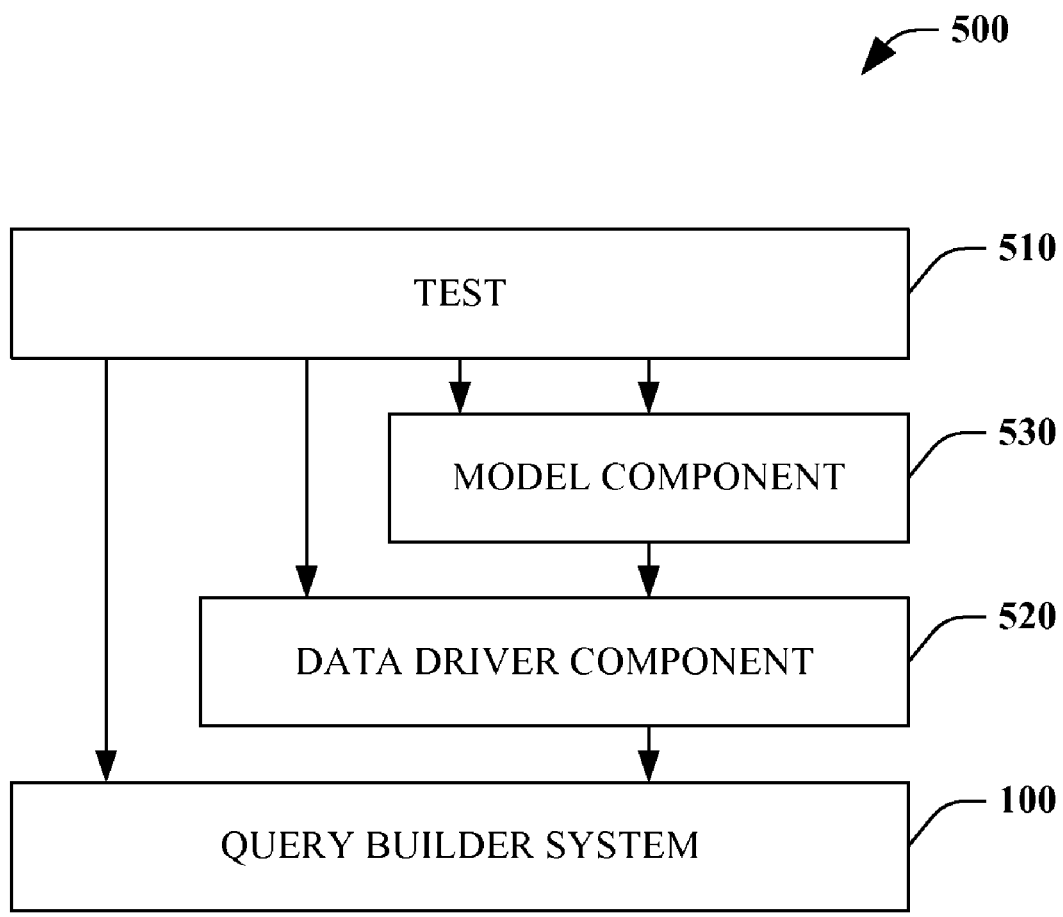
FIG. 5 is a block diagram of query generation system including components to enable model and data driven testing according to a disclosed aspect.

Referring to FIG. 5, a test-query generation system 500 is depicted in accordance with an aspect of the claimed subject matter. The system 500, illustrated as an architectural stack for purposes of clarity, includes the abstract query builder system 100, as previously presented. In particular, the abstract query builder system 100 can generate an abstract representation of a test or test input 510 that can subsequently be transformed into language specific query syntax. The system 500 also includes a data driver component 520 and a model component 530.

The data driver component 520 can receive or retrieve test input and produces additional tests driven over different data. Stated differently, the data driver component 520 injects functionality with respect to a test 510 to drive or execute the test 510 over a variety of data (e.g., data, types, tables, schema . . . ) rather than solely data initially specified. Since hard-codedness has been removed from test scenarios by way of the abstract query builder system 100 (as well as verification), this lends itself not only to running a scenario against "Customers" table, for example, but to leverage the same scenario over other tables, columns, data types, data, etc. instead of managing all these from within the test itself. Consequently, a tester can focus more on interesting scenarios and less on permutations, combinations, or specifics of each source. Among other things, the data driver component 520 can employ attributes, enumerables, models, stacks or input files to drive tests.

By way of example and not limitation, consider a test query of the form "SELECT<column>FROM<tables>WHERE (<column>!=x)." Such a query can be data driven as follows:

```
public void Test3( )
{
    foreach(Table table in this.Workspace.Tables)
    {
        foreach(Column column in table.Columns)
        {
            table.Query.Select( ).Where(
                Expression.NotEqual(
                    Expression.Member(column),
                    Expression.Constant(
                        column.Type,
                        column.CreateData( )
                    )
                )
            ).Verify( );
        }
    }
}
```

Here, the test query is driven over each column of every table in a workspace (or data store). The data driver component 520 can inject such "foreach" code to iterate over the workspace. Additionally or alternatively, a user upon specification of such scenario-based tests can include data driving functionality.

The system 500 also includes a model component 530 that facilitates generation of arbitrarily complex query test cases that might not otherwise be produced. A model of query behavior including rules and/or actions can be produced or otherwise acquired with assistance from the model component 520. Rather than affording such rules (e.g., operators allowed, valid sequences . . . ) on each test 510, the query language model can be provided to the abstract query builder system 100 or otherwise maintained at a customized query builder level. The query model can subsequently be employed by either the model component 530 and/or the abstract query builder system 100 to generate, derive, or otherwise influence production of test queries based on the model. Furthermore, it should be appreciated that model derived or influenced test queries can be also be data driven by data driver component 520.

Model based or driven testing in this context has many advantages. First, rules need only be specified once in a single location that is easy to maintain, improve, and/or review. Second, the model is self-contained and thus easily driven by a machine. Additionally, a single model can drive numerous formats, and it is composable into expression and operator models. Furthermore, the models can produce custom behavior.

Where the abstract query builder system 100 is embodied as an API, introduction of knowledge of query language production rules makes it a model. Given this fact, the abstract query builder system 100 can be operated in three manners: an influential manner that facilitates functional testing, an exploration manner as in random automatic generation of queries, or a hybrid approach of both.

Figure 6:
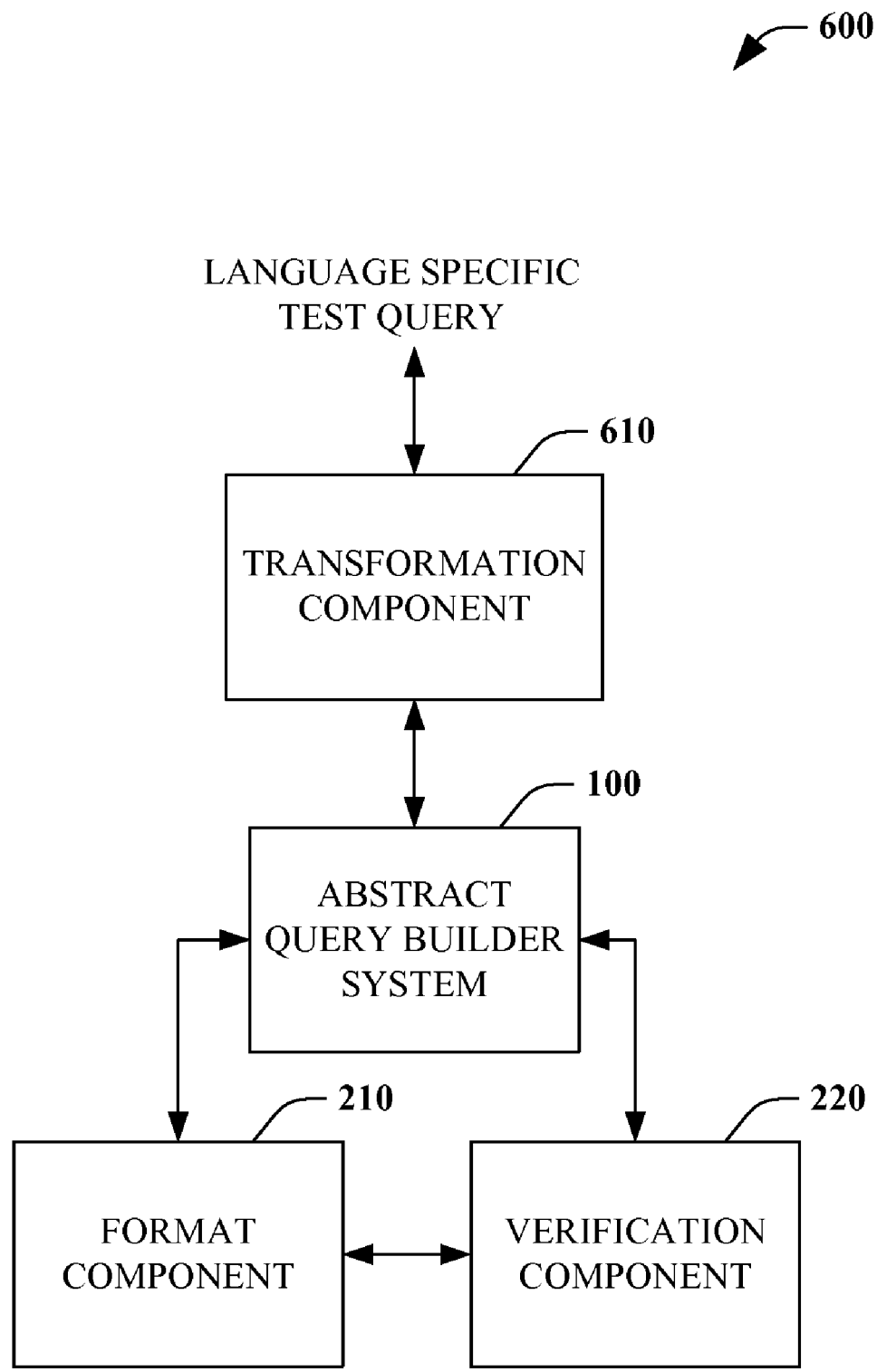
FIG. 6 is a block diagram of a query generation system that leverages language specific queries in accordance with an aspect of the disclosed subject matter.

FIG. 6 illustrates a query generation system 600 in accordance with an aspect of the aspect of the claimed subject matter. Similar to previously described systems 200 and 400 of FIGS. 1 and 2 respectively, the system 600 includes the abstract query builder system 100, format component 210, and verification component 220. To recap briefly, the abstract query builder system 100 facilitates construction of an abstract query representation independent of any particular query language. The format component 210 enables transformation of the abstract representation into a language specific query, and verification component 220 facilitates determining correct functioning of the query associated with a default and/or custom implementation. In accordance with one embodiment, the abstract query builder system 100 can receive or retrieve a test or test input for generation of an abstract representation thereof. In particular the test, while being query language independent should be specified in a form recognized by the abstract query builder system 100 (e.g., operators, expressions).

The system 600 further includes a query transformation component 610 communicatively coupled to that abstract query builder component 110. The transformation component 610 bridges differences between specific language queries and those accepted by the abstract query builder component 110. In some instances, it may be desired to construct entirely new test queries for the abstract query builder. However, many years have already been spent to develop language specific queries. The transformation component 610 enables these queries to be leveraged by mapping them from their query language specific form to a form acceptable by the abstract query builder system 100. Consequently, a language specific query test can be retargeted to a different language specific query test. Stated differently, tests can go from specific to general and back to specific.

Figure 7:
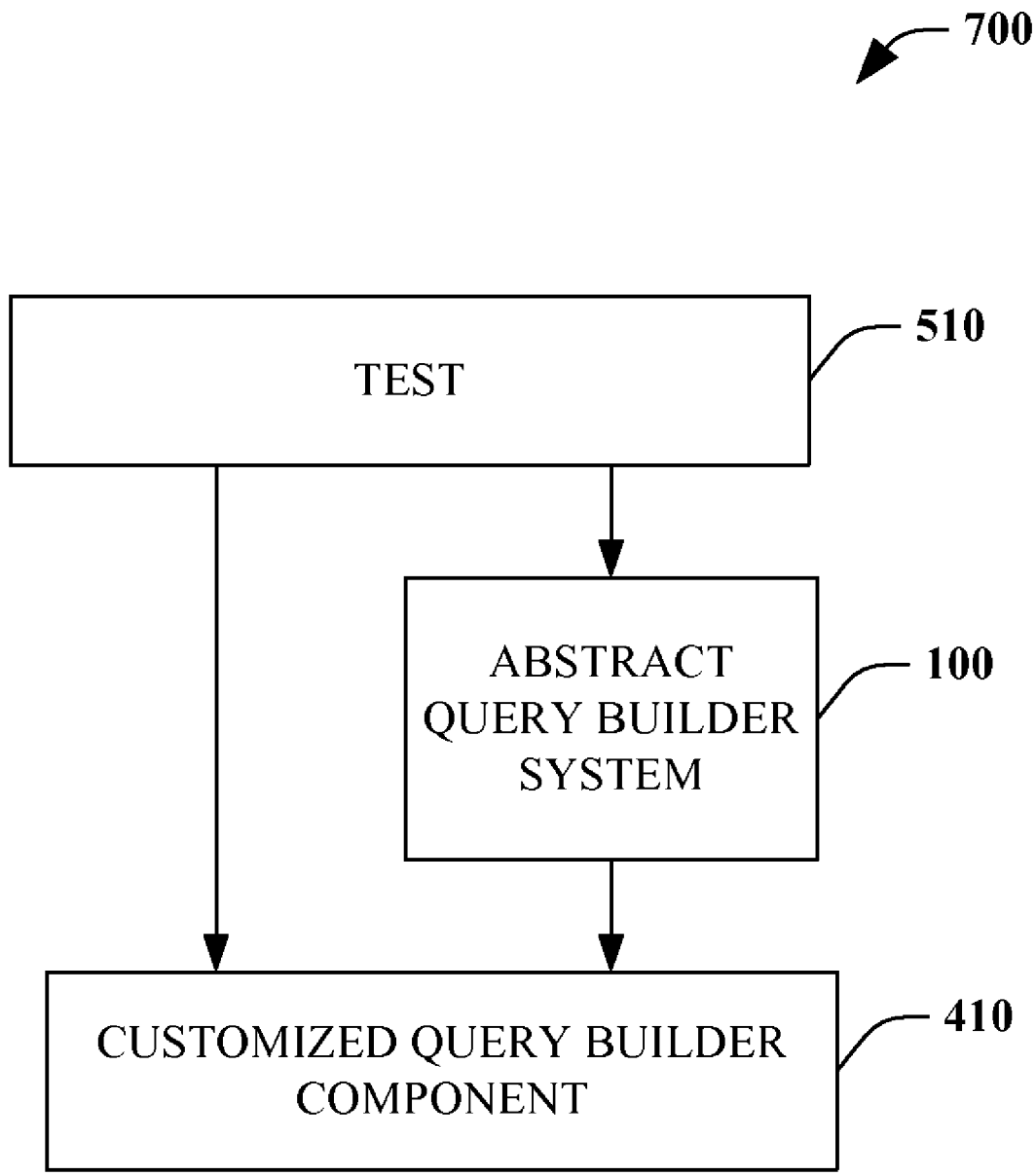
FIG. 7 is a block diagram of system that handles query specific concepts according to a disclosed aspect.

Turning attention to FIG. 7, a system 700 illustrates how specific language query concepts are handled in accordance with an aspect of the claimed subject matter. Language specific queries or concepts can be bridged by customized query builders. In particular, a test 510 is provided to the abstract query builder system component 100 and a derived or customized query builder component 410 is responsible for translating the query to a specific query language. In the event a test needs something unique to that language (e.g., not provided by the abstract query builder), the test 510 communicates directly with the customized query builder component 410 for those particular operators, while the remainder go through the abstract query builder system 100.

The aforementioned systems, architectures, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. For example, the abstract query builder component 110 can include the format component 120 and the verification component 120. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the transformation component 610 can employ such mechanism to infer the appropriate matching syntax accepted by the abstract query builder component 110.

In view of the exemplary systems described supra, methodologies that may be implemented in accordance with the disclosed subject matter will be better appreciated with reference to the flow charts of FIGS. 8-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 8:
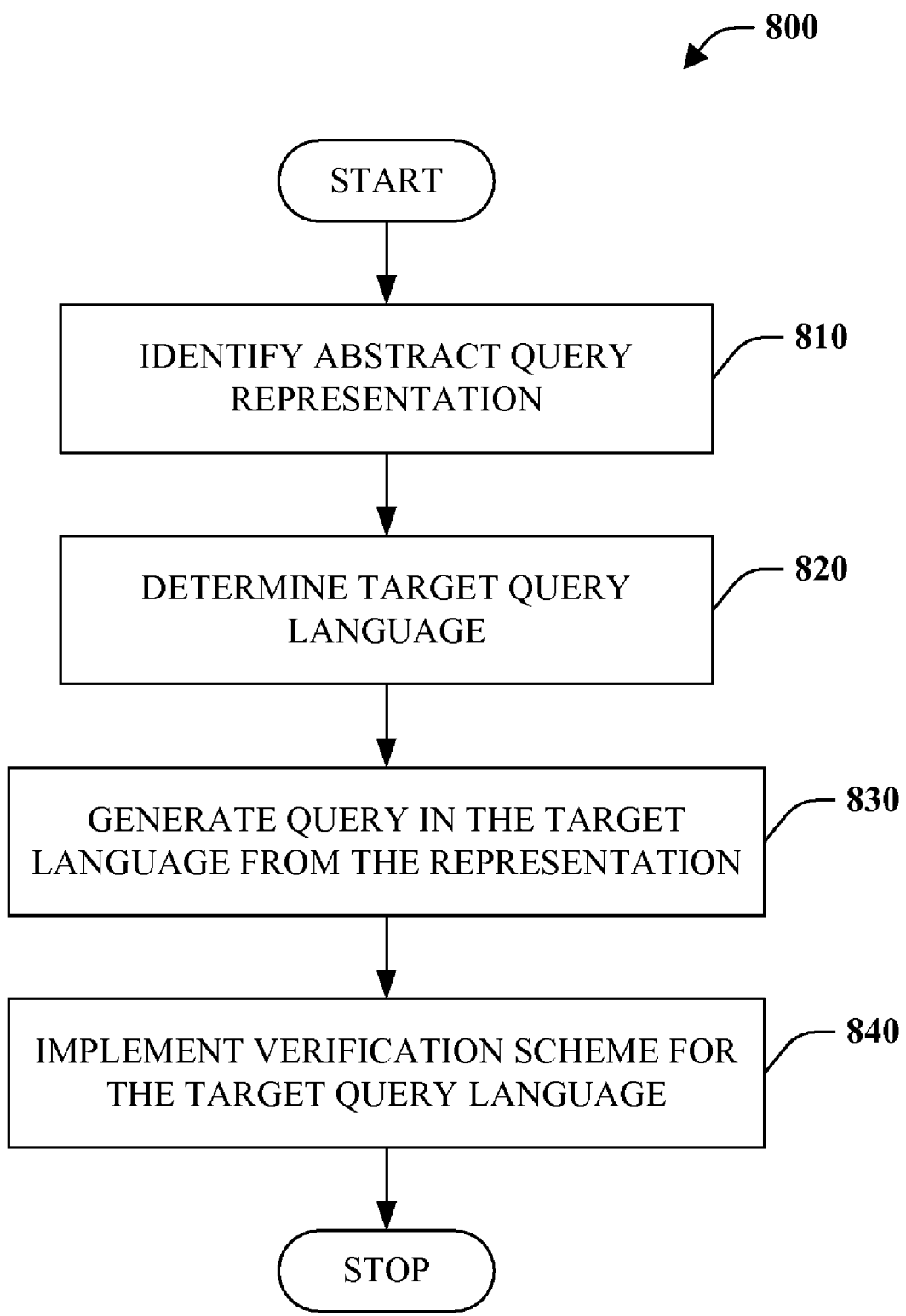
FIG. 8 is a flow chart diagram of a method of test query generation in accordance with an aspect of the disclosure.

Referring to FIG. 8, a method of test query generation 800 is depicted in accordance with an aspect of the claimed subject matter. At reference numeral 810, an abstract query representation is identified. This representation can be independent of any specific or known query language and potentially embodied in a tree or other structure. At 820, a target query language is determined based on a product to be tested. At numeral 830, a query in the target query language is generated from the abstract representation. For instance, an expression tree can be inspected and abstracted concepts transformed into language specific concepts in accordance with the language syntax/grammar. Based on the target query language, a verification scheme can also be implemented or configured, at reference numeral 840, to enable a correctness determination with respect to the test. Verification involves acquiring a reference result for the query and comparing that to an actual result. A particular query language and/or storage format (e.g., SQL, XML . . . ) may necessitate utilization of a particular mechanism.

Figure 9:
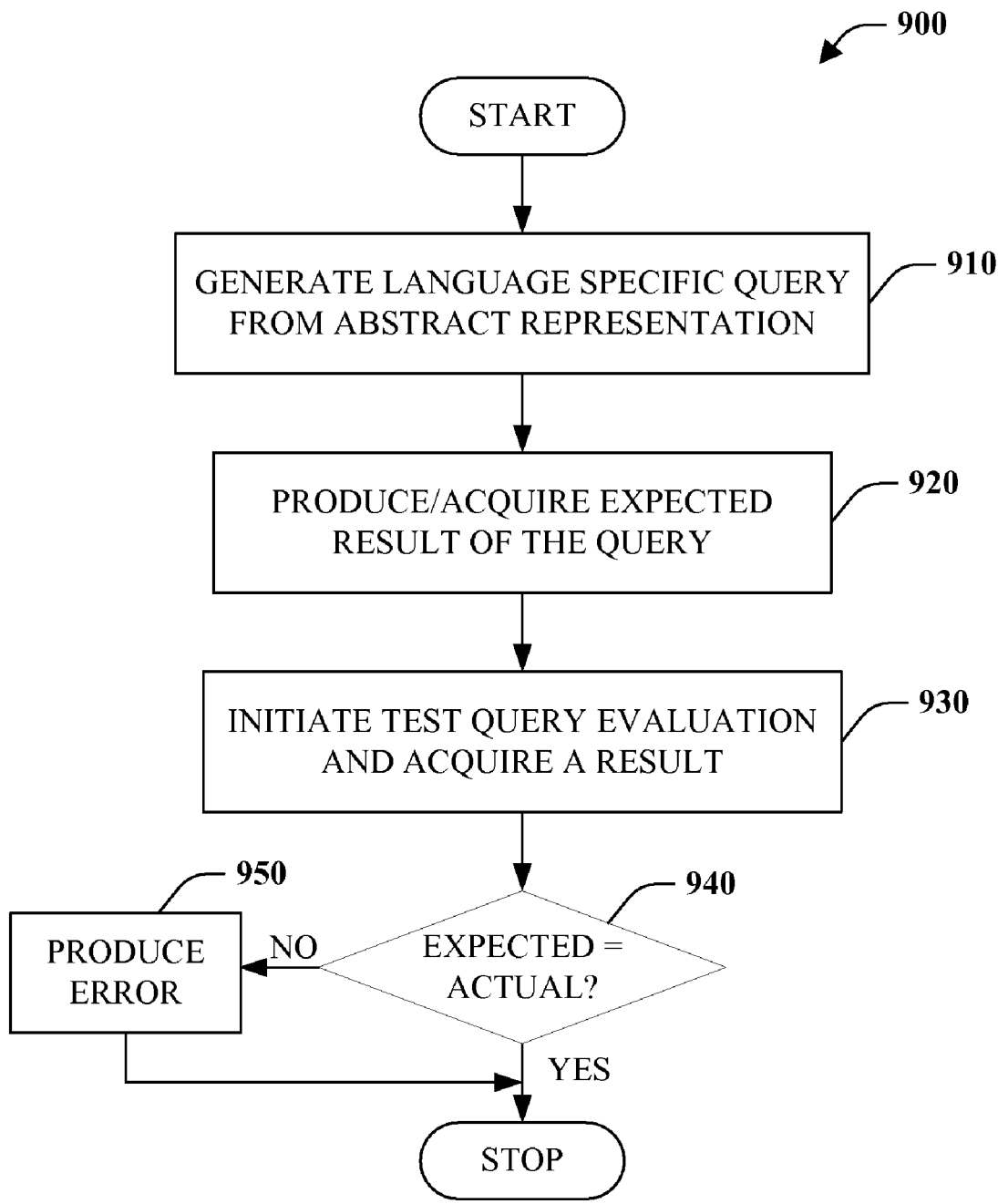
FIG. 9 is a flow chart diagram of a query testing method according to a disclosed aspect.

FIG. 9 is a flow chart diagram of a query testing method 900 in accordance with a claimed aspect. At reference numeral 910, a specific language test query is generated from an abstract representation. An expected result is produced, acquired, or otherwise obtained for the test query, at numeral 920. For example, a query evaluation can be delegated to a reference system or alternatively an expected cache can be generated and refined. At reference 930, test evaluation on a system is initiated and a result obtained. The actual results are then compared to the expected results at 950. If the results are the same ("YES"), the method simply terminates. Alternatively, if results are different ("NO"), an error is produced at reference 960 indicating the query produced incorrect results prior to terminating.

Figure 10:
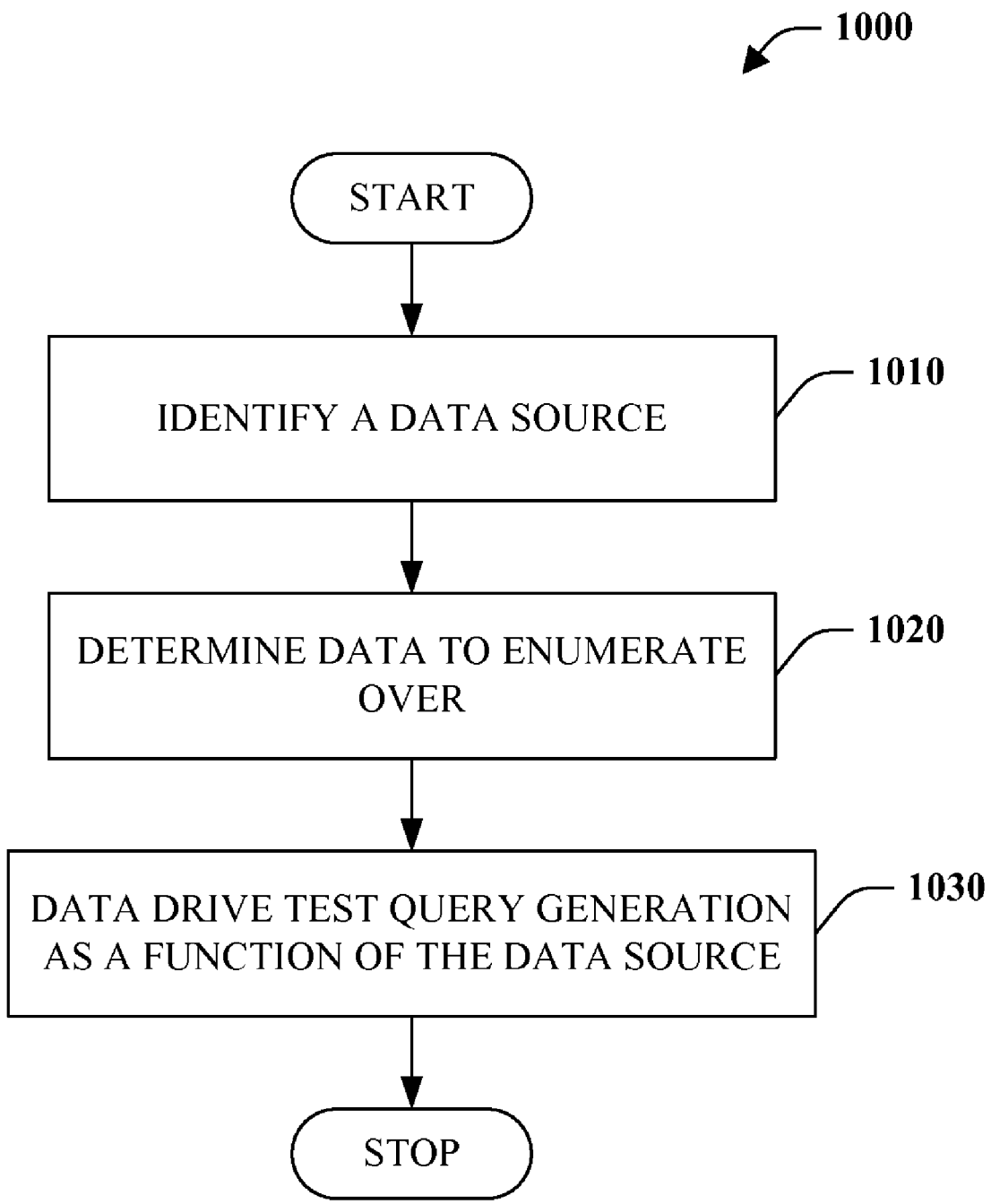
FIG. 10 is a flow chart diagram of a method of query test generation utilizing data driving in accordance with a disclosed aspect.
Figure 11:
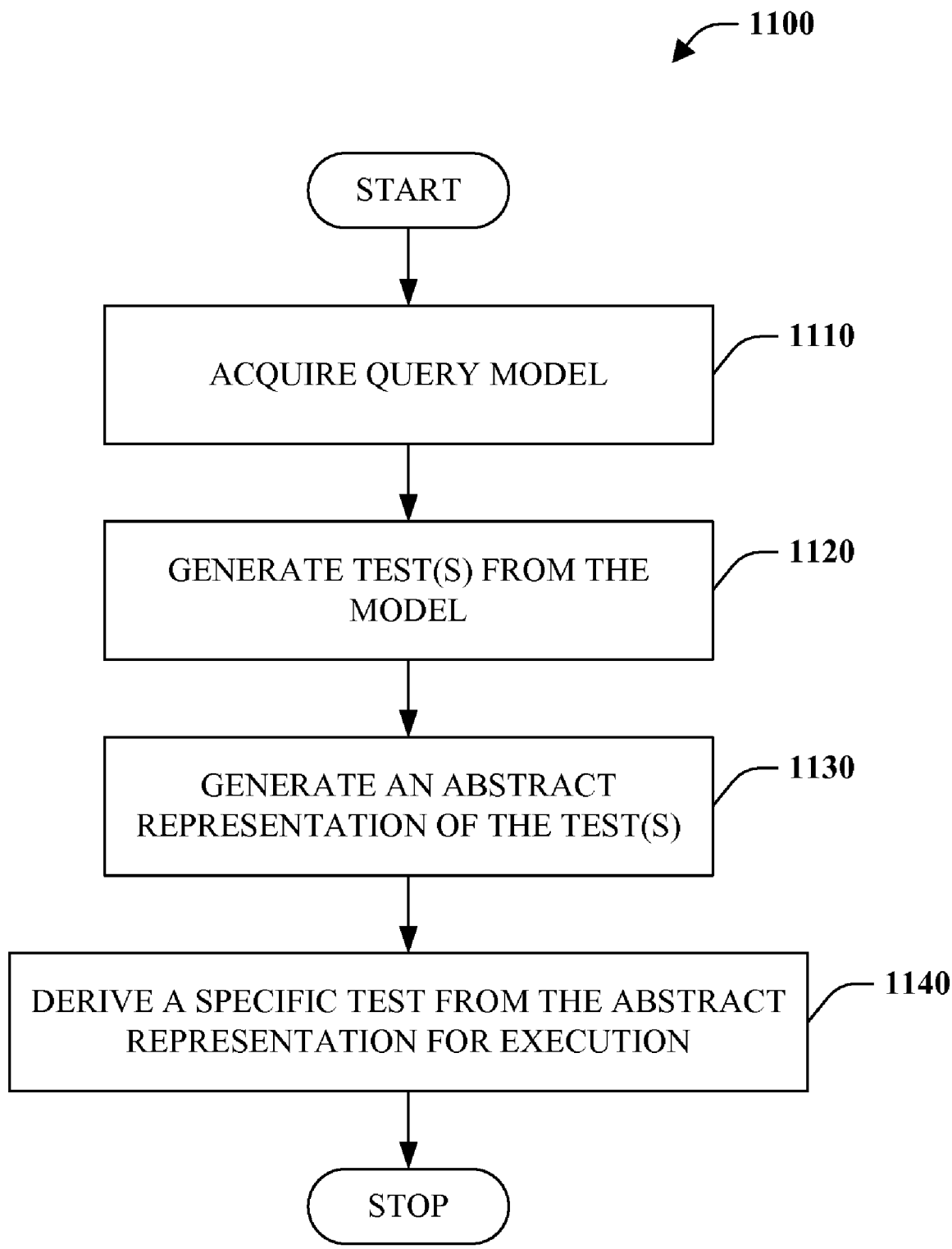
FIG. 11 is a flow chart diagram of a method of query test generation utilizing a model-driven approach according to an aspect of the disclosure.

Turning attention to FIG. 10, a flow chart diagram depicts a method of test query generation according to an aspect of the claimed subject matter. At reference numeral 1010, a data source is identified such as that over which queries will be evaluated. At numeral 1020, determine data to enumerate over such as tables, columns, rows, types, or views, among other things. This can be done explicitly via for each constructs, for instance, or implicitly by introspection. At reference numeral 1030, abstract query generation is data-driven utilizing the identified data source. In other words, queries can be specified automatically across and entire or subset of data. This relieves query specification of the onus of specification of a number of queries across data. Moreover, this allows a tester to focus more on interesting scenarios and less on permutations, combinations, and specifics of a data source FIG. 11 illustrates a query generation method that employs models 1100 in accordance with an aspect of the claimed subject matter. At reference numeral 1110, a query model is received, retrieved, or otherwise acquired. The query model can define acceptable query behavior in terms of one or more rules and/or actions. In one instance, an API and/or other mechanisms can be employed by a user to generate the model. Further, the model can be composed of operations and expressions in accordance with one embodiment and as shown in model 1110 of FIG. 11. At numeral 1120, a plurality of language independent tests are generated as a function of the model. Additionally or alternatively, specification of other tests is influenced by the model. By way of example, a model can provide a rule regarding a sequence of operators such as "JOIN(A) JOIN(B) JOIN(C)" or a sequence of expressions such as "SELECT (A, B, C)". Rather than requiring a tester to specify all combinations and permutations, this can be done automatically. At reference number 1130, an abstract representation of the model-derived queries is generated. For example, a tree can be generated that includes query operators and expressions. At numeral 1140, language specific queries are derived from the abstract representation for execution and verification. It is to be noted that although not depicted, the model-derived queries can also be data driven as previously described. In any event, query testing is substantially improved by automating test generation as well as leveraging abstraction to enable generation of multiple language specific queries.

Figure 12:
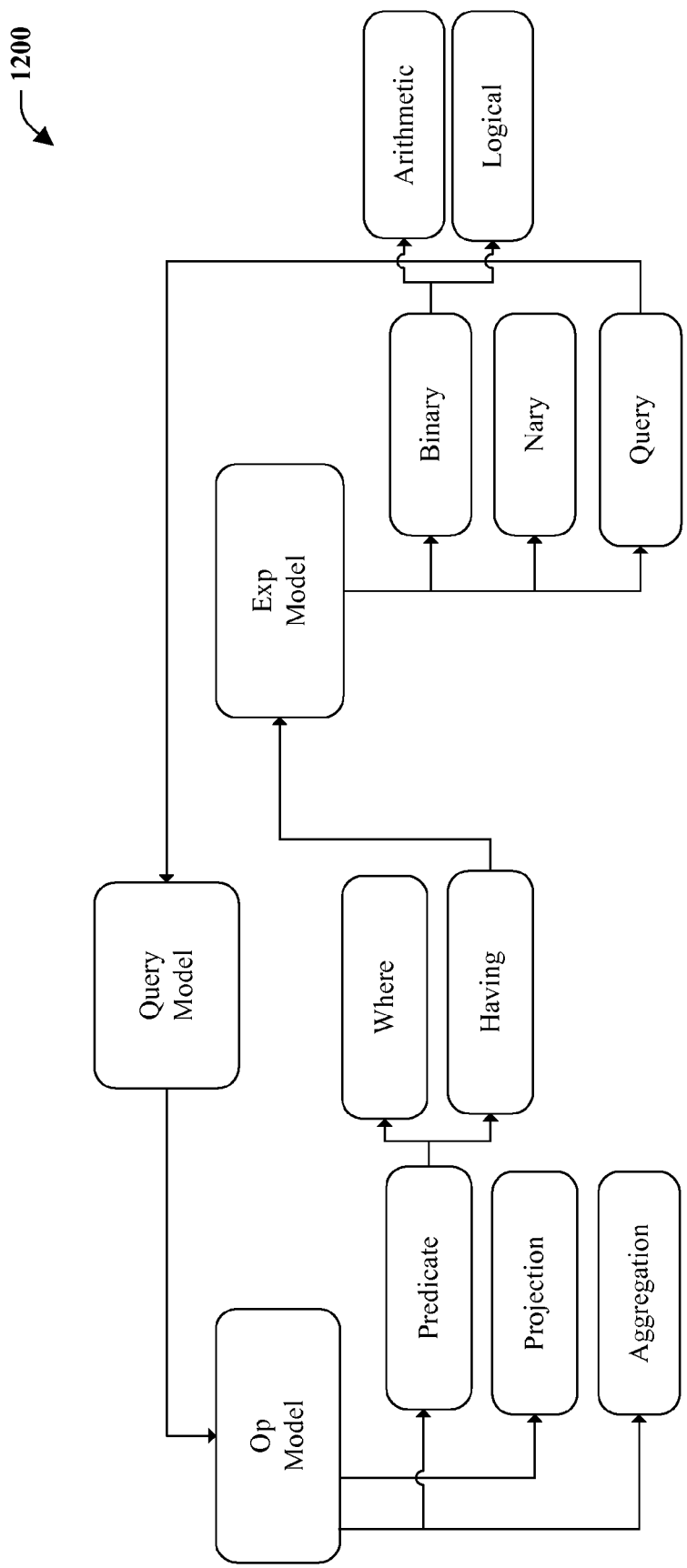
FIG. 12 is a graphical illustration of an exemplary model in accordance with an aspect of the disclosure.

In accordance with one embodiment, the model can call into a query builder system or component, and subsequently custom syntax can be produced and results verified. The model can have two parts, namely model operators (e.g., predicate, projection, aggregation . . . ) and model expressions (e.g., binary, nary, query . . . ) as shown in the exemplary model 1200 of FIG. 12. Both of those are then passed to the query builder, which generates the abstract representation. In essence, acts 1120 and 1130 of FIG. 11 are merged.

The term "query" or variations in form thereof as used herein is intended to encompass interrogation of a collection of data. While query is often thought of with respect to relational database systems and the like, the use of the term "query" is not limited in this manner. In fact, the term "query" can also employed with respect to non-relational scenarios including, without limitation, search (e.g., Internet, distributed . . . ). For example, a test search or query can be derived from an abstract query representation.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 13:
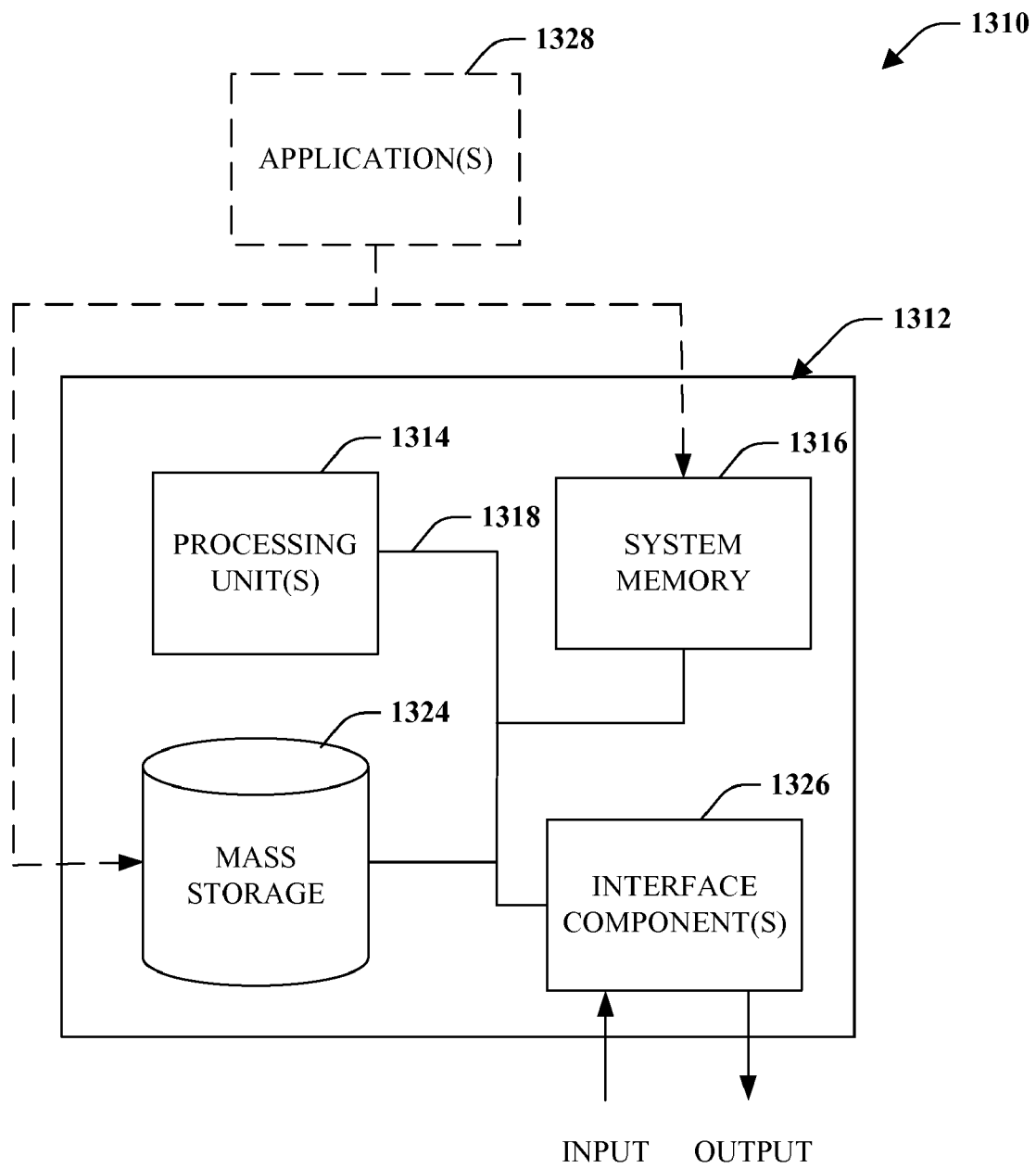
FIG. 13 is a schematic block diagram illustrating a suitable operating environment for aspects of the subject disclosure.
Figure 14:
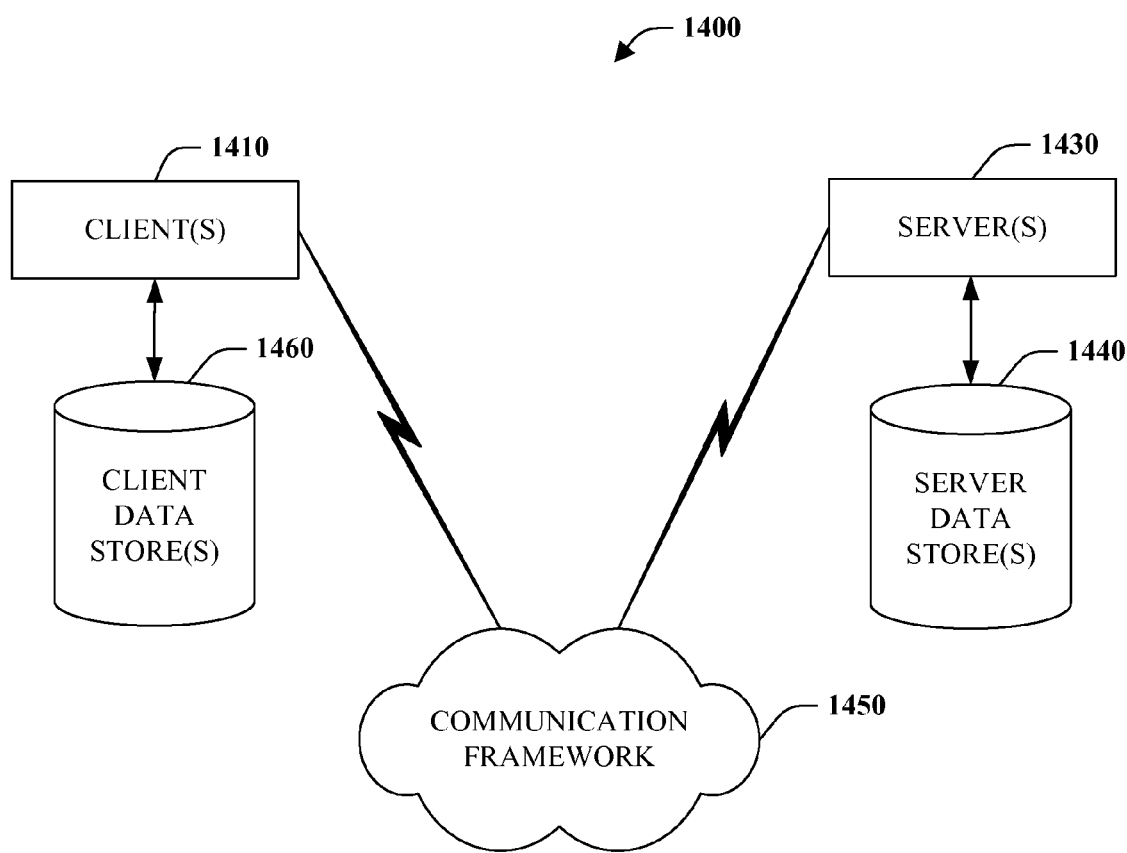
FIG. 14 is a schematic block diagram of a sample-computing environment.

In order to provide a context for the various aspects of the disclosed subject matter, FIGS. 13 and 14 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 13, an exemplary environment 1310 for implementing various aspects disclosed herein includes a computer 1312 (e.g., desktop, laptop, server, hand held, programmable consumer or industrial electronics . . . ). The computer 1312 includes a processing unit 1314, a system memory 1316, and a system bus 1318. The system bus 1318 couples system components including, but not limited to, the system memory 1316 to the processing unit 1314. The processing unit 1314 can be any of various available microprocessors. It is to be appreciated that dual microprocessors, multi-core and other multiprocessor architectures can be employed as the processing unit 1314.

The system memory 1316 includes volatile and nonvolatile memory. The basic input/output system (BIOS), containing the basic routines to transfer information between elements within the computer 1312, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1312 also includes removable/non-removable, volatile/non-volatile computer storage media. FIG. 13 illustrates, for example, mass storage 1324. Mass storage 1324 includes, but is not limited to, devices like a magnetic or optical disk drive, floppy disk drive, flash memory, or memory stick. In addition, mass storage 1324 can include storage media separately or in combination with other storage media.

FIG. 13 provides software application(s) 1328 that act as an intermediary between users and/or other computers and the basic computer resources described in suitable operating environment 1310. Such software application(s) 1328 include one or both of system and application software. System software can include an operating system, which can be stored on mass storage 1324, that acts to control and allocate resources of the computer system 1312. Application software takes advantage of the management of resources by system software through program modules and data stored on either or both of system memory 1316 and mass storage 1324.

The computer 1312 also includes one or more interface components 1326 that are communicatively coupled to the bus 1318 and facilitate interaction with the computer 1312. By way of example, the interface component 1326 can be a port (e.g., serial, parallel, PCMCIA, USB, FireWire . . . ) or an interface card (e.g., sound, video, network . . . ) or the like. The interface component 1326 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer, and the like. Output can also be supplied by the computer 1312 to output device(s) via interface component 1326. Output devices can include displays (e.g., CRT, LCD, plasma . . . ), speakers, printers, and other computers, among other things.

FIG. 14 is a schematic block diagram of a sample-computing environment 1400 with which the subject innovation can interact. The system 1400 includes one or more client(s) 1410. The client(s) 1410 can be hardware and/or software (e.g., threads, processes, computing devices). The system 1400 also includes one or more server(s) 1430. Thus, system 1400 can correspond to a two-tier client server model or a multi-tier model (e.g., client, middle tier server, data server), amongst other models. The server(s) 1430 can also be hardware and/or software (e.g., threads, processes, computing devices). The servers 1430 can house threads to perform transformations by employing the aspects of the subject innovation, for example. One possible communication between a client 1410 and a server 1430 may be in the form of a data packet transmitted between two or more computer processes.

The system 1400 includes a communication framework 1450 that can be employed to facilitate communications between the client(s) 1410 and the server(s) 1430. The client(s) 1410 are operatively connected to one or more client data store(s) 1460 that can be employed to store information local to the client(s) 1410. Similarly, the server(s) 1430 are operatively connected to one or more server data store(s) 1440 that can be employed to store information local to the servers 1430.

Client/server interactions can be utilized with respect with respect to various aspects of the claimed subject matter. By way of example and not limitation, at least a subset of the components described above can be embodied as network services provided by a server 1430 to one or more clients 1410, for instance, across the communication framework 1450. In one exemplary scenario, the abstract query builder system 100 as well as the format and verification components, 210 and 220 respectively, can be provided as a network or web service that provisions language specific test queries and a mechanism for verification.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

APPENDIX A

The following are exemplary class definitions associated with sample query specifications utilized supra. Note these are provided solely to aid clarity and understanding with respect to aspects of the disclosure and not to limit the scope or spirit of the appended claims.

```
public abstract class Query                                  //Abstract contract
{
   //Builder API
   public abstract Query        Build( );
   public virtual Query         Select(Expression projections)
   public virtual Query         From(Expression target);
   public virtual Query         Where(Expression expression)
   public virtual Query         Sort(Expression expressions)
   //...
   //Formatter
   public abstract String       ToString( );
   //Verification
   public abstract void         Verify( );
}
public class Expression                                      //Expression tree
abstraction
{
   //Data
   public abstract Type         Type            //Resulting type
   {
get;
   }
   public abstract ExpressionsOperands          //Nodes
   {
get;
   }
   //Builder API
   //Logical
   public static Expression     And(Expression left, Expression right);
   public static Expression     Or(Expression left, Expression right);
   public static Expression     Not(Expression left, Expression right);
   //...
   //Comparison
   public static Expression     Equal(Expression left, Expression right);
   public static Expression     GreaterThan(Expression left, Expression right);
   public static Expression     LessThan(Expression left, Expression right);
   //...
   //Arithmatic
   public static Expression     Plus(Expression left, Expression right);
   public static Expression     Minus(Expression left, Expression right);
   public static Expression     Div(Expression left, Expression right);
   //...
   //Type
   public static Expression     IsOf(Expression left, Expression right);
   public static Expression     TreatAs(Expression left, Expression right);
   public static Expression     Cast(Expression left, Expression right);
   //...
   //etc
}
```

What is claimed is:

1. A query builder system, comprising:
a processor coupled to a memory, the processor configured to execute the following computer-executable components stored in the memory:
an interface component that receives input descriptive of a desired test; and
a builder component that constructs an abstract test query representation from the input independent of any particular query language to facilitate application of the test query to a specific query language.

2. The system of claim 1, the input comprises a number of query operators and expressions.

3. The system of claim 1, further comprising a format component that produces a formatted query specific to a data source from the abstract representation.

4. The system of claim 3, further comprising a custom component that overrides the format component and derives a specific query language implementation from the abstract representation.

5. The system of claim 3, further comprising a verification component that facilitates comparison of an expected query result with actual query results to determine query correctness.

6. The system of claim 5, the verification component computes the expected query result.

7. The system of claim 5, the verification component delegates computation of the expected query result to a reference system.

8. The system of claim 5, the custom component overrides the verification component with custom verification for the specific query language implementation.

9. The system of claim 1, further comprising a component that automatically drives the test query across a variety of data structures.

10. The system of claim 1, further comprising a component that facilitates derivation of test queries as a function of a model that defines rules and/or actions allowed by a query language.

11. A method of multi-language query testing, comprising:
employing at least one processor configured to execute computer-executable instructions stored in memory to perform the following acts:
constructing an abstract representation of a test query that is query language independent;
generating a query language specific implementation of the query from the abstract representation; and
producing a verification scheme for the specific query language to facilitate verification of query results.

12. The method of claim 11, further comprising driving the query over a set of data to leverage a query scenario over various data.

13. The method of claim 12, further comprising deriving at least a portion of the test query from a model associated with the specific query language.

14. The method of claim 13, further comprising affording a mechanism to build the query model to facilitate automatic generation of arbitrarily complex test queries.

15. The method of claim 11, constructing the representation comprising generating an abstract expression tree including query operators and expressions.

16. The method of claim 11, comprising generating a verification scheme that delegates generation of an expected result to a reference query engine associated with a query language different from the specific query language.

17. The method of claim 11, comprising generating a verification scheme that maintains an internal expected cache.

18. The method of claim 11, further comprising initiating execution of the test query, and employing the verification scheme to determine whether returned results are correct.

19. A query language test system, comprising:
means for building an abstract representation of a test query independent of any query language;
means for producing a specific query language query from the abstract representation; and
means for implementing a verification scheme for the specific query language to facilitate verifying query correctness.

20. The system of claim 19, further comprising a means of deriving at least a portion of the query from a language specific model and a means for driving data across the query.

* * * * *